United States Patent
Pelz et al.

(10) Patent No.: US 7,716,929 B2
(45) Date of Patent: May 18, 2010

(54) ARRANGEMENT FOR RECIRCULATION OF EXHAUST GASES OF A SUPER-CHARGED INTERNAL COMBUSTION ENGINE

(75) Inventors: Magnus Pelz, Tullinge (SE); Henrik Skog, Northampton (GB); Håkan Sarby, Huddinge (SE)

(73) Assignee: Scania CV AB (publ) (SE)

( * ) Notice: Subject to any disclaimer, the term of this patent is extended or adjusted under 35 U.S.C. 154(b) by 331 days.

(21) Appl. No.: 10/598,706

(22) PCT Filed: Mar. 31, 2005

(86) PCT No.: PCT/SE2005/000460

§ 371 (c)(1),
(2), (4) Date: Sep. 26, 2006

(87) PCT Pub. No.: WO2005/095780

PCT Pub. Date: Oct. 13, 2005

(65) Prior Publication Data

US 2007/0204619 A1    Sep. 6, 2007

(30) Foreign Application Priority Data

Mar. 31, 2004    (SE)    .................................... 0400857

(51) Int. Cl.
F02B 75/08    (2006.01)
(52) U.S. Cl. ................................. 60/605.2; 123/568.12
(58) Field of Classification Search ............ 123/568.12; 60/599, 605.2
See application file for complete search history.

(56) References Cited

U.S. PATENT DOCUMENTS

| | | | |
|---|---|---|---|
| 4,317,439 A * | 3/1982 | Emmerling | ................. 123/563 |
| 5,215,044 A | 6/1993 | Banzhaf et al. | .......... 123/41.29 |
| 5,607,010 A | 3/1997 | Schönfeld et al. | ............. 165/51 |
| 5,791,146 A * | 8/1998 | Dungner | .................... 60/605.2 |
| 6,216,458 B1 | 4/2001 | Alger et al. | ................ 60/605.2 |

(Continued)

FOREIGN PATENT DOCUMENTS

DE    198 53 455 A1    6/1999

(Continued)

OTHER PUBLICATIONS

International Search Report PCT/SE2005/000460 dated Jun. 1, 2005 (Swedish Patent Office).

*Primary Examiner*—Thomas Denion
*Assistant Examiner*—Douglas J. Duff
(74) *Attorney, Agent, or Firm*—Ostrolenk Faber LLP

(57)    ABSTRACT

An arrangement for recirculation of exhaust gases in a supercharged combustion engine. The arrangement includes an exhaust line operable to lead exhaust gases out from the combustion engine, an inlet line operable to lead air at above atmospheric pressure to the combustion engine, a return line which comprises a connection to the exhaust line and a connection to the inlet line, so that via the return line it is possible to recirculate exhaust gases from the exhaust line to the inlet line. A first cooler incorporated in the return line for cooling the exhaust gases in the return line before they are mixed with the air in the inlet line. The exhaust gases in the first cooler are cooled by a first medium which is at a temperature substantially corresponding to the temperature of the surroundings.

6 Claims, 1 Drawing Sheet

U.S. PATENT DOCUMENTS

| | | | |
|---|---|---|---|
| 6,244,256 B1 * | 6/2001 | Wall et al. | 123/568.12 |
| 6,301,888 B1 * | 10/2001 | Gray, Jr. | 60/605.2 |
| 6,470,682 B2 * | 10/2002 | Gray, Jr. | 60/605.2 |
| 6,978,772 B1 * | 12/2005 | Dorn et al. | 123/568.12 |
| 7,059,308 B2 * | 6/2006 | Eitel et al. | 123/568.12 |
| 7,171,957 B2 * | 2/2007 | Liu et al. | 123/568.12 |
| 7,189,374 B1 * | 3/2007 | Hawker | 422/168 |
| 7,195,006 B2 * | 3/2007 | Khair et al. | 123/568.12 |
| 7,210,468 B1 * | 5/2007 | Saele | 123/568.12 |
| 7,210,469 B1 * | 5/2007 | Saele | 123/568.12 |
| 7,299,771 B2 * | 11/2007 | Wei et al. | 123/41.08 |
| 7,299,793 B1 * | 11/2007 | Tyo et al. | 123/568.12 |
| 7,461,641 B1 * | 12/2008 | Styles et al. | 123/568.12 |
| 2003/0033993 A1 * | 2/2003 | Valaszkai et al. | 123/41.31 |
| 2005/0109484 A1 * | 5/2005 | Kolb et al. | 165/42 |
| 2006/0124115 A1 * | 6/2006 | Brookshire et al. | 123/568.12 |
| 2007/0267000 A1 * | 11/2007 | Raduenz et al. | 123/568.12 |
| 2008/0047533 A1 * | 2/2008 | Kardos | 123/568.12 |

FOREIGN PATENT DOCUMENTS

| | | |
|---|---|---|
| EP | 1 091 113 A2 | 4/2001 |

\* cited by examiner

ARRANGEMENT FOR RECIRCULATION OF EXHAUST GASES OF A SUPER-CHARGED INTERNAL COMBUSTION ENGINE

CROSS REFERENCE TO RELATED APPLICATION

The present application is a 35 U.S.C. §§371 national phase conversion of PCT/SE2005/000460, filed 31 Mar. 2005, which claims priority of Swedish Application No. 0400857-9, filed 31 Mar. 2004. The PCT International Application was published in the English language.

BACKGROUND TO THE INVENTION, AND STATE OF THE ART

The present invention relates to an arrangement for recirculation of exhaust gases in a supercharged combustion engine and to cooling the recirculated exhaust gases. p The technique known as EGR (Exhaust Gas Recirculation) is a known way of leading part of the exhaust gases from a combustion process in a combustion engine back, via a return line, to an inlet line for supply of air to the combustion engine. A mixture of air and exhaust gases is thus supplied via the inlet line to the engine's cylinders in which the combustion takes place. The addition of exhaust gases to the air causes a lower combustion temperature resulting inter alia in a reduced content of nitrogen oxides $NO_x$ in the exhaust gases. This technique is applied in both Otto engines and diesel engines.

The amount of air which can be supplied to a supercharged combustion engine depends on the pressure of the air but also on the temperature of the air. Supplying the largest possible amount of air to the combustion engine therefore entails cooling the compressed air in a charge air cooler before it is led to the combustion engine. The compressed air is cooled in the charge air cooler by ambient air flowing through the charge air cooler. The compressed air can thus be cooled to a temperature which is only a few degrees higher than the temperature of the surroundings. In cases where EGR technology is used, the returned exhaust gases also need cooling. This is achieved by means of a so-called EGR cooler. An EGR cooler is usually connected to the combustion engine's cooling system so that the exhaust gases are cooled in the EGR cooler by the circulating coolant in the cooling system. The EGR cooler is thus subject to the limitation that the exhaust gases cannot be cooled to a lower temperature than the temperature of the coolant in the cooling system. The cooled exhaust gases are therefore usually at a higher temperature than the cooled compressed air when they are put into the inlet line to the combustion engine. The mixture of exhaust gases and air being led to the combustion engine will therefore be at a higher temperature than the compressed air led into a supercharged combustion engine which is not provided with recirculation of exhaust gases. The performance of a supercharged combustion engine equipped with EGR is therefore somewhat inferior to that of a supercharged combustion engine not equipped with EGR.

SUMMARY OF THE INVENTION

The object of the invention is to provide an arrangement which effects recirculation of exhaust gases in a supercharged combustion engine in such a way that the recirculation of exhaust gases does not result in the combustion engine's performance being inferior to that of a corresponding combustion engine not provided with recirculation of exhaust gases.

Exhaust gases are cooled in a cooler by a cooling medium which is at a temperature substantially corresponding to the temperature of the surroundings. The exhaust gases can thereby be cooled to a temperature which is just above the temperature of the surroundings. The exhaust gases can thus be brought to a temperature substantially corresponding to the temperature at which the compressed air is after cooling in a conventional charge air cooler. The mixture of exhaust gases and compressed air supplied to the combustion engine is therefore not at a higher temperature than the compressed air supplied to a corresponding combustion engine not equipped with recirculation of exhaust gases. The performance of a combustion engine with an arrangement according to the present invention can therefore substantially correspond to that of a combustion engine not equipped with EGR.

According to a preferred embodiment of the present invention, said first medium is ambient air. Ambient air is at all times an available medium and needs no complicated equipment to cause it to flow through the first cooler. Using ambient air as cooling medium makes it possible for the exhaust gases to be cooled down to a level close to the temperature of the ambient air. The same cooling medium is therefore used in the first cooler as in a conventional charge air cooler for cooling of compressed air. This means that exhaust gases can be cooled to the same level as the compressed air in a conventional charge air cooler. The arrangement is used with advantage in a vehicle which is powered by the combustion engine. The result is a natural flow of ambient air through the first cooler during operation of the vehicle. A cooling fan may possibly be incorporated to guarantee the air flow through the first cooler.

According to a preferred embodiment of the present invention, the arrangement comprises a second cooler adapted to cooling the exhaust gases in the return line. A gaseous cooling medium such as air is usually not particularly effective as regards carrying heat away in a cooler. There are substantially more effective coolers than those which are cooled by air. It is therefore advantageous to use such a more effective second cooler for cooling the hot exhaust gases as a first step before they are cooled by the first cooler. Said second cooler is preferably cooled by a liquid medium. A liquid medium usually provides much more effective cooling than a gaseous medium. A liquid-cooled cooler which has the same cooling capacity as an air-cooled cooler can therefore be made considerably smaller. When such a liquid-cooled second cooler is incorporated in the return line, the temperature of the exhaust gases can be lowered in an effective manner as a first step. A significantly lower cooling capacity is therefore required of the first cooler and the latter can therefore be made significantly smaller. The liquid medium may be adapted to circulating in a cooling system which is also adapted to cooling the combustion engine. In such cases the existing coolant in the vehicle's cooling system is thus used for cooling the exhaust gases as a first step. Although the temperature of the coolant will be higher than the temperature of the ambient air, the result is a relatively large difference between the temperature of the coolant and the temperature of the exhaust gases. The coolant in said second cooler can thus provide effective cooling of the exhaust gases.

According to another preferred embodiment, the arrangement comprises a third cooler for cooling the air in the inlet line before it is mixed with the exhaust gases from the return line. Such a third cooler is with advantage air-cooled and may be a conventional charge air cooler. The first cooler and the third cooler may advantageously be positioned close to one another. As both the first cooler and the third cooler are air-cooled, they can be arranged at a substantially common location where ambient air flows through them. In such cases the first cooler and the third cooler may form an integrated unit. The result is a composite modular cooler unit which is easy to fit in the vehicle. The first cooler and the third cooler may take the form of flat cooler elements which each have a main extent in one plane, whereby the first cooler and the third cooler have an extent in a substantially common plane. In such cases the cooling air flows through the coolers in a direction substantially perpendicular to said plane.

According to another preferred embodiment of the present invention, said first cooler and said third cooler are positioned close to a fourth cooler in order to cool the coolant in a cooling system which is also adapted to cooling the combustion engine. The location of the first cooler and the third cooler is thus in a region of the vehicle which is already designed to cater for a throughflow of ambient air. In this case a cooling fan may possibly be incorporated with a larger capacity for providing effective cooling of the coolant in the cooling system, the exhaust gases in the first cooler and the compressed air in the third cooler.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
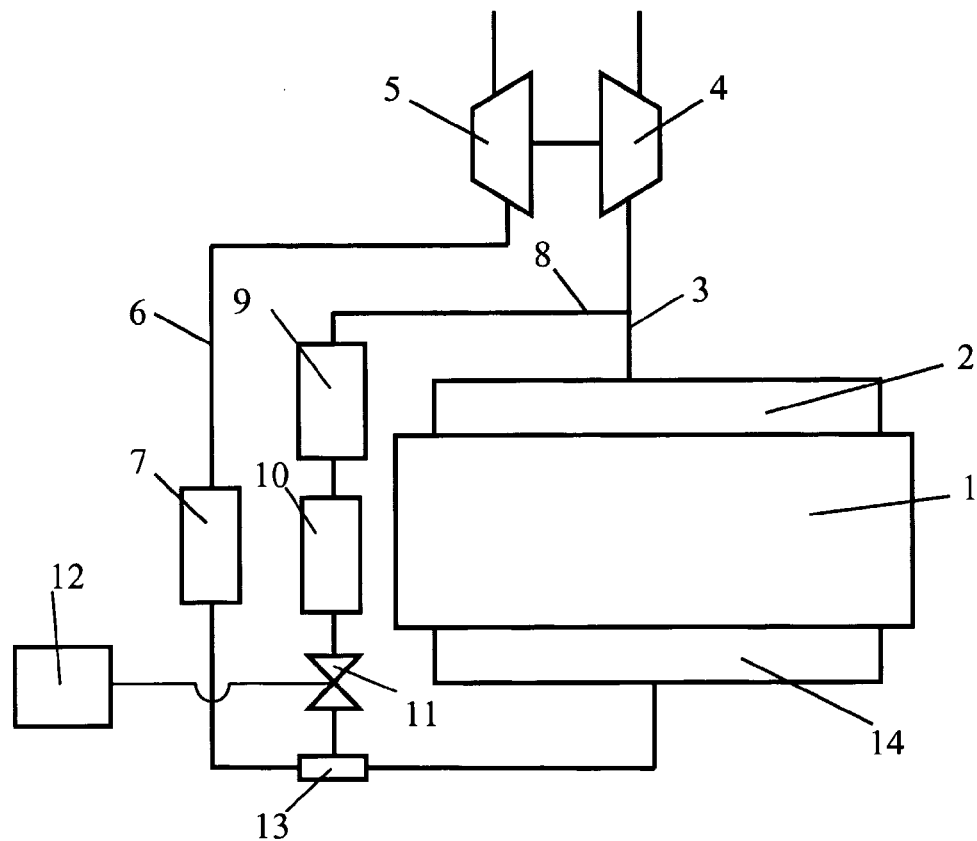
FIG. 1 depicts an embodiment of an arrangement for recirculation of exhaust gases in a supercharged diesel engine.

FIG. 1 depicts schematically an arrangement for recirculation of exhaust gases in a supercharged combustion engine. The combustion engine may in this case be a diesel engine 1. Such recirculation is usually called EGR (Exhaust Gas Recirculation). Adding exhaust gases to the compressed air which is led to the engine's cylinders lowers the combustion temperature and hence also the content of nitrogen oxides (NOx) which are formed during the combustion processes. The diesel engine 1 may for example be intended to power a heavy vehicle. The exhaust gases from the cylinders of the diesel engine 1 are led via an exhaust manifold 2 to an exhaust line 3. The exhaust gases in the exhaust line 3, which are at above atmospheric pressure, are led to a turbine 4. The turbine 4 is thus provided with driving power which is transferred, via a connection, to a compressor 5. The compressor 5 compresses the air which is led into the inlet line 6. A charge air cooler 7 is arranged in the inlet line 6. The purpose of the charge cooler 7 is to cool the compressed air before it is led to the diesel engine 1. The compressed air is cooled in the charge air cooler 7 by ambient air.

A return line 8 is intended to cater for recirculation of part of the exhaust gases from the exhaust line 3. The return line 8 comprises an EGR cooler 9 in which the EGR cooled as a first step. The return line 8 also comprises an exhaust gas cooler 10 for cooling the exhaust gases as a second step. The exhaust gases are cooled in the exhaust gas cooler 10 by ambient air. The return line 8 further comprises a valve in the form of an EGR valve 11 by which the exhaust gas flow in the return line 8 can be shut off as necessary. The EGR valve 11 can be used for control the amount of exhaust gases led via the return line 8 to the inlet line 6. The EGR valve 11 may alternatively be situated before the EGR cooler 9 or between the EGR cooler 9 and the exhaust gas cooler 10. A control unit 12 is adapted to controlling the EGR valve 11 on the basis of information about the current operating state of the diesel engine 1. The control unit 12 may be a processor or computer unit provided with suitable software. In supercharged diesel engines 1 the pressure of the exhaust gases in certain operating situations will be lower than the pressure of the compressed air in the inlet line 6. In such situations it is not possible to mix the exhaust gases in the return line 8 directly with the compressed air in the inlet line 6 without special auxiliary means. To this end it is possible to use for example a venturi 13. If the combustion engine is instead a supercharged Otto engine, the exhaust gases can be led directly into the inlet line 6, since the exhaust gases of an Otto engine in substantially all operating situations will be at a higher pressure than the compressed air in the inlet line 6. When the exhaust gases have been mixed with the compressed air in the inlet line 6, the mixture is led via a manifold 14 to the respective cylinders of the diesel engine 1.

Figure 2A:
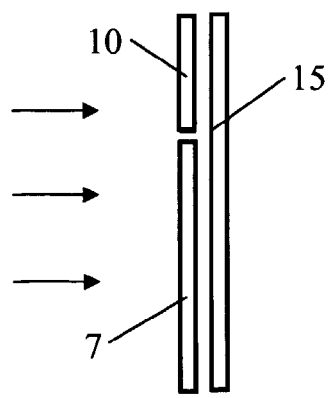
FIG. 2a depicts schematically the layout of a charge air cooler and an exhaust gas cooler according to a first embodiment and FIG. 2b depicts schematically the layout of a charge air cooler and an exhaust gas cooler according to a second embodiment.
Figure 2B:
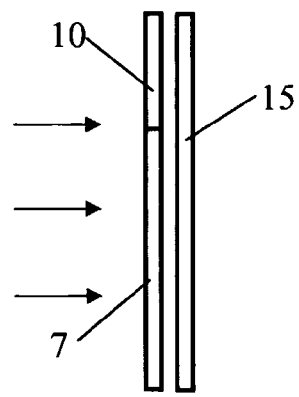

FIGS. 2a, b depict schematically two different embodiments of a charge cooler 7 and an exhaust gas cooler 10. The charge air cooler 7 and the exhaust gas cooler 10 comprise pipe systems and cooling flanges which together constitute substantially flat cooler packages which have an extent mainly in one plane. The charge air cooler 7 and the cooler 10 take the form in FIG. 2a of two separate units. However, they are fitted alongside one another so that they have an extent in a substantially common plane. The direction of flow of the air through the coolers 7, 10 is represented by arrows in the diagrams. The cooling air flows through the charge air cooler 7 and the exhaust gas cooler 10 in a direction substantially perpendicular to the respective planes of extent of the coolers. The charge air cooler 7 and the exhaust gas cooler 10 constitute in FIG. 2b an integrated unit. The charge air cooler 7 and the exhaust gas cooler 10 are in this case combined with one another in a suitable manner. The result is a composite modular cooler unit which is easy to fit in a vehicle. The charge air cooler 7 and the exhaust gas cooler 10 are situated close to a conventional cooler 15 for cooling the coolant in the vehicle's cooling system. The charge air cooler 7 and the exhaust gas cooler 10 are arranged at a distance from the conventional cooler 15. The common plane of extent of the charge air cooler 7 and the exhaust gas cooler 10 is parallel with the main plane of extent of the conventional cooler element 15. In such cases ambient air flows first through the charge air cooler 7 and the exhaust gas cooler 10 before it flows through the conventional cooler 15.

During operation of the diesel engine 1, the exhaust gases drive the turbine 4. The turbine 4 is thus provided with driving power which drives a compressor 5. The compressor 5 compresses the air which is led into the inlet line 6. In most operating states of the diesel engine 1 the control unit 12 keeps the EGR valve 11 open so that part of the exhaust gases in the exhaust line 3 is led into the return line 8. In this situation the exhaust gases are at a temperature of about 600-700° C. When the exhaust gases in the return line 8 reach the EGR cooler 9 they undergo a first step of cooling. At this stage the exhaust gases are cooled by the coolant in the cooling system. The exhaust gases are subjected here to their main temperature reduction. The EGR cooler 9 is subject, however, to the limitation that it can at best cool the exhaust gases to a temperature corresponding to the temperature of the coolant. The temperature of the coolant in the cooling system may vary but in normal operation is usually within the range 80-100° C. The amount of compressed air and exhaust gases which can be supplied to the diesel engine 1 depends on the pressure of the air and the exhaust gases but also on the latter's temperature. It is therefore important to provide further cooling of the recirculating exhaust gases. Exhaust gases are therefore led into the exhaust gas cooler 10 in which they are cooled by ambient air. Using ambient air as cooling medium makes it possible for the exhaust gases to be cooled down to a level close to the temperature of the ambient air. Exhaust gases can thus be cooled to substantially the same level as the compressed air in the charge air cooler 7.

In supercharged diesel engines 1 in certain operating situations the pressure of the exhaust gases will thus be lower than the pressure of the compressed air in the inlet line 6. The venturi 13 can be used to reduce the static pressure of the air in the inlet line 6 locally, close to the return line 8, so that the exhaust gases can be led into and mixed with the compressed air in the inlet line 6. The exhaust gases and the compressed air, which in this situation are at substantially the same temperature, are thereafter led via the manifold 14 to the respective cylinders of the diesel engine 1. A diesel engine with such cooling in two steps of the recirculating exhaust gases can thus cool the exhaust gases to the same level as the compressed air in the inlet line. Its performance can therefore substantially correspond to that of a combustion engine not equipped with EGR.

The invention is in no way limited to the embodiment illustrated in the drawing but may be varied freely within the scopes of the claims. Thus it is not inconceivable to use only the exhaust gas cooler 10 for cooling the exhaust gases in the return line 8 to a temperature substantially corresponding to the temperature of the surroundings.

The invention claimed is:

1. An arrangement for recirculation of exhaust gases in a supercharged combustion engine, the arrangement comprising:
    an exhaust line configured to lead the exhaust gases out from the combustion engine;
    an inlet line configured to lead air at above atmospheric pressure to the combustion engine; and
    a return line comprising:
    a connection to the exhaust line and a connection to the inlet line positioned and configured so that the return line is configured to recirculate the exhaust gases from the exhaust line to the inlet line;
    a second cooler provided to cool the exhaust gases in the return line by use of a liquid medium in the second cooler;
    a first cooler using ambient air as a cooling medium and configured to cool the exhaust gases and incorporated in the return line downstream from the second cooler and upstream from a mixture point where the exhaust gases are mixed with the air in the inlet line; and
    a third cooler configured to cool the air in the inlet line before the air is mixed with the exhaust gases from the return line,
    wherein the first cooler is positioned in close physical proximity to the third cooler such that the first cooler and the third cooler together comprise a flat integrated cooler package having a main extent in one plane, the first cooler positioned relative to the third cooler such that both have the main extent in the one plane,
    wherein the first cooler has a shortest side and the third cooler has a shortest side, the shortest side of the first cooler facing the shortest side of the third cooler over at least a majority of the shortest side of the first cooler.

2. The arrangement according to claim 1, further comprising a cooling system in which the liquid medium is circulated and the cooling system is configured to cool the combustion engine using the liquid medium.

3. The arrangement according to claim 1, further comprising a fourth cooler positioned in close physical proximity to the first cooler and the to third cooler, the fourth cooler being configured to cool the coolant in a cooling system.

4. The arrangement according to claim 1, further comprising:
    a cooling system in which the liquid medium is circulated and the cooling system is configured to cool the combustion engine; and
    a fourth cooler disposed in close physical proximity to the first cooler and to the third cooler, the fourth cooler configured to cool the coolant in the cooling system.

5. The arrangement according to claim 1, wherein the first cooler comprises an integrally separate unit from the third cooler.

6. The arrangement according to claim 1, wherein the shortest side of the first cooler and the shortest side of the third cooler are perpendicular to the one plane.

* * * * *